United States Patent [19]

Smith, Jr. et al.

[11] Patent Number: 4,940,619
[45] Date of Patent: Jul. 10, 1990

[54] RADIATION ABSORPTION DEVICE

[76] Inventors: W. Novis Smith, Jr., 412 S. Perth St., Philadelphia, Pa. 19147; Michael G. Carroll, P.O. Box 681, Pittston, Pa. 18640

[21] Appl. No.: 399,343

[22] Filed: Aug. 25, 1989

Related U.S. Application Data

[63] Continuation-in-part of Ser. No. 105,311, Oct. 5, 1987, abandoned.

[51] Int. Cl.$^5$ ............................................. B32B 9/00
[52] U.S. Cl. ....................................... 428/74; 428/76; 428/99; 428/192; 428/193; 428/252; 428/285; 428/286; 428/287; 428/337; 428/340; 428/408; 428/919
[58] Field of Search ................... 428/74, 76, 99, 192, 428/193, 252, 285, 286, 287, 337, 340, 408, 919

[56] References Cited

U.S. PATENT DOCUMENTS

| | | | |
|---|---|---|---|
| 3,239,669 | 3/1966 | Weinberger | 250/519.1 |
| 3,733,606 | 5/1973 | Johansson | 343/18 A |
| 3,895,143 | 7/1975 | Tarlow | 428/354 |
| 4,034,375 | 7/1977 | Wallin | 428/919 |
| 4,219,218 | 8/1980 | Waldon | 280/770 |
| 4,378,322 | 3/1983 | Atterbury et al. | 428/402 |
| 4,435,465 | 3/1984 | Ebneth et al. | 428/408 |
| 4,471,015 | 9/1984 | Ebneth et al. | 428/389 |
| 4,479,994 | 10/1984 | Berg | 428/919 |
| 4,581,284 | 4/1986 | Eggert et al. | 428/283 |
| 4,602,051 | 7/1986 | Nabeta et al. | 524/66 |
| 4,621,012 | 11/1986 | Pusch | 428/242 |
| 4,678,699 | 7/1987 | Kritchevsky et al. | 428/175 |

FOREIGN PATENT DOCUMENTS 8400807  3/1984  Australia ................................ 114/15

OTHER PUBLICATIONS

Definition of "Harness"—p. 554—Webster's Dictionary—1984.

Primary Examiner—Marion C. McCamish
Attorney, Agent, or Firm—John Lezdey

[57] ABSTRACT

A harness for a marine or land vehicle for absorbing electromagnetic radiation and as a protective cover comprising a pair of flexible sheet material having therebetween a flexible matrix containing carbon fiber.

8 Claims, 1 Drawing Sheet

RADIATION ABSORPTION DEVICE

This is a continuation-in-part of application Ser. No. 105,311, filed Oct. 5, 1987, now abandoned.

FIELD OF THE INVENTION

The present invention relates to a means for absorbing electromagnetic radiation in order to prevent interferences with electronic components on marine and land vehicles. More specifically, the present invention relates to a harness for an automobile or boat which is capable of absorbing and/or reflecting radiation at frequencies throughout the electromagnetic spectrum.

BACKGROUND OF THE INVENTION

In the automobile and marine industry development has already started with regard to electronic equipment for operating various components of the vehicle. Voice mechanisms are already in use for starting the vehicle and operating various accessories. It is well known, that noise and electromagnetic radiation from surrounding areas, such as generated by large trucks, can prevent or interfere with the function of the electronic components such as radios.

The present use for absorbing radiation in the spectral range from visible light to radar waves has been for military use.

Pusch U.S. Pat. No. 4,621,012, which is herewith incorporated by reference, discloses camouflage material made up of a sequence of sequential layers of a textile fabric base, a thermoplastic coating containing randomly distributed dipole materials having semi-conductive properties and a metallic layer. The material is in the form of a net to be placed over a stationary installation.

Eggert et al U.S. Pat. No. 4,581,284, which is herein incorporated by reference, discloses a fiber compound material of individual layers of superposed fibers piles which are joined together by a matrix of a resin and a hardener and acts as a load carrying structure to absorb electromagnetic waves. The material is used as a load carrying structure.

U.S. Pat. No. 3,733,606 addresses the problem of detection by radar by using camouflage material consisting of a multi-layered material both absorbing and reflecting radar signals. There is utilized non-homogeneous electrically conducting films.

SUMMARY OF THE INVENTION

The present invention relates to a means for attachment to a motor vehicle which can absorb and/or reflect electromagnetic radiation including radiation from visible light to radar. More particularly, the present invention relates to a harness which is placed on the front portion of a marine or land vehicle such as a car, truck, tractor, boat and the like.

In accordance with the invention there is provided a flexible cover for the front portion or hood of an automobile vehicle or a covering for a motor comprising a dispersion of carbon fiber in a flexible polymer matrix or adhesive resin that is provided between a pair of radiation transmitting flexible sheets.

The polymer matrix or adhesive means may be comprised of plastisols, polyurethanes, rubber latex, polyvinyl chloride, butadiene-acrylonitrile copolymer, and the like. The polymeric matrix is suitably of a thickness of about 0.1 to 0.5 inches, preferably 0.25–0.35 inches. Although a thicker matrix may be utilized, it is not generally required and increases the cost.

The carbon fibers are utilized in an amount of about 1–10 oz/yd$^2$ and randomly distributed throughout the polymeric matrix.

Also, an anti-static agent such as 0.5 to 10 weight/% may be added such as an alkylamine.

The sheets may be woven or non-woven natural or synthetic fabric which may be rubber, cotton, polyester, polyvinyl chloride, nylon, mylar, polyvinyl, polyamide, polyolefin such as polyethylene, polypropylene, and the like, halogenated polyolefin such as chlorinated polypropylene, and the like.

It is important in connection with the present invention for short range radiation absorption that the carbonaceous material utilized comprise fibers having a length of at least 1 mm, preferably up to about 30 mm. Carbon particles cannot be utilized since there is insufficient electrical length to provide suitable short range absorption. Also, metallic particles cannot be used for short ranges since they cause reflectance electromechanical radiation would be scattered rather than absorbed so that interference may occur.

According to a preferred embodiment there is provided a harness for a land or marine vehicle for use in absorbing electromagnetic radiation and as a protective cover comprising a pair of flexible sheets of synthetic material. A flexible resinous matrix having incorporated therein chopped carbon fibers in an amount of about 1–10 oz/yd$^2$, preferably 3 oz/yd$^2$, and means for attaching the harness cover to the vehicle.

It is therefore an object of the invention to provide a covering for the front of a land or marine vehicle to absorb electromagnetic radiation.

It is another object of the invention to provide a radar have absorbing means for land and marine vehicles.

It is a further object of the invention to provide a protective covering for the hood of an automobile to prevent chips and abrasions.

Other objects and a fuller understanding of the invention will be had by referring to the following description and claims of a preferred embodiment, taken in conjunction with the accompanying drawings, wherein like reference characters refer to similar parts throughout the several views.

DESCRIPTION OF THE PREFERRED EMBODIMENT OF THE INVENTION

Figure 1:
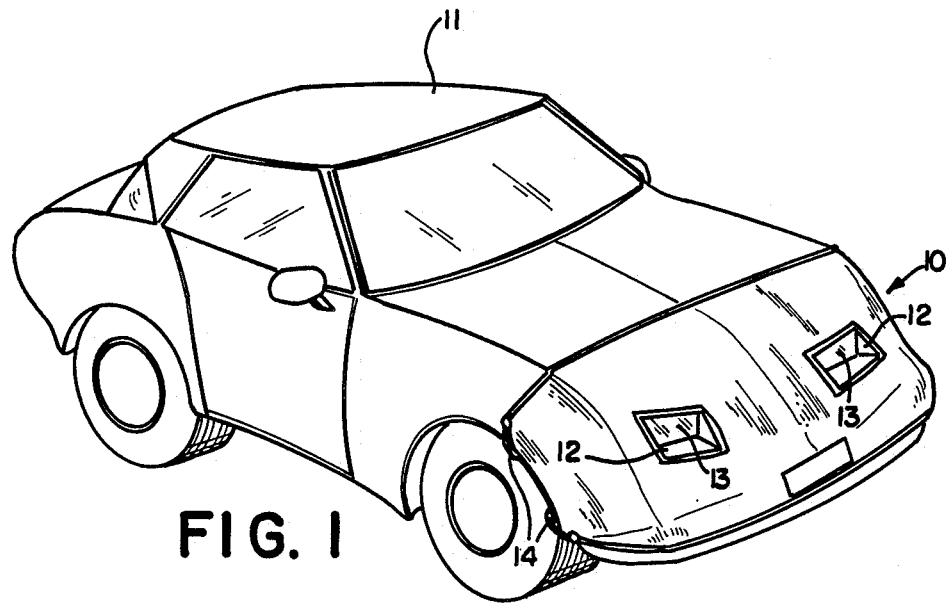
FIG. 1 is a perspective view of an automobile harness of the invention.

Although specific terms are used in the following description for the sake of clarity, these terms are intended to refer only to the particular structure of the invention selected for illustration in the drawings, and are not intended to define or limit the scope of the invention.

As seen in FIG. 1 there is provided a harness 10 which is attached to a vehicle 11 with fastening means 14. The harness 10 covers the hood of the vehicle 11 except for openings 12 for the headlights 13. Merely covering the hood of the vehicle 11 is sufficient to prevent interference from electromagnetic radiation from the surrounding areas which may cause interference with radios, electronic starters, and the like. In addition, radar waves are absorbed or deflected away.

Figure 2:
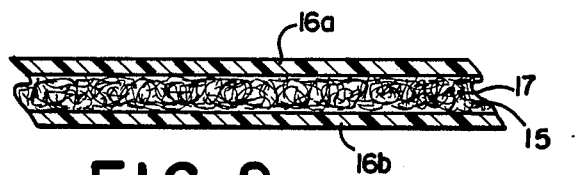
FIG. 2 is a cross-sectional view of the harness.

In FIG. 2, there is shown a section of the harness 10. The textile or non-woven fabric 16a,16b is suitably a synthetic textile fabric having a weight of 80 to 150 g/m². A layer of flexible resin matrix 17 is suitably about 0.25-0.35 inches in thickness. It incorporates about 5-10% by volume of randomly distributed carbon fibers which have semi-conductive properties. The laminate may be prepared by admixing the adhesive 17 with the semi-conductive materials which includes the carbon fibers 15, coating a formed layer 16b, and then adhering the formed layer 16a under slight pressure. The periphery may then be joined by heat and/or pressure preferably at about 100-200 newtons/cm² at a temperature of 80°-100° C.

Figure 3:
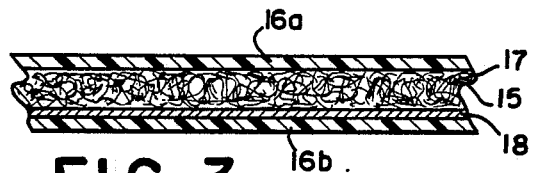
FIG. 3 is a cross-sectional view of another harness of the invention.

FIG. 3 shows another embodiment of the invention wherein a metallic layer 18 is placed at the bottom of the adhesive layer 17 so as to reflect upwardly into the carbon fibers those radiation rays which may have missed the materials so as to cause complete extinction of the electromagnetic waves. The metallic layer 18 is particularly preferred when the body parts of the vehicle 11 are fiberglass.

If desired, the harness of the invention may he provided with vents to prevent the accumulation of moisture.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A wrapping covering for a marine vehicle or for wrapping about the front of a land vehicle for absorbing electromagnetic radiation, for preventing interference on a radio or electronic starter and as a protective cover against abrasion consisting essentially of:
    A. a pair of flexible polymeric sheet material which are joined along the periphery by heat and/or pressure;
    B. a flexible matrix between said sheets, said matrix consisting of a resinous material with carbon fibers randomly incorporated therein, said carbon fibers randomly distributed in said matrix in an amount of about 1-10 oz/yd², and attachment means associated with said covering for removably attaching said cover to the vehicle and being transported by the vehicle.

2. The cover of claim 1 wherein said matrix is an adhesive.

3. The cover of claim 1 wherein said carbon fibers are chopped fibers.

4. The cover of claim 1 wherein said sheets are non-woven.

5. The cover of claim 1 wherein said sheets comprise natural or synthetic materials selected from the group consisting of rubber, cotton, polyvinyl, polyamide, polyolefin, halogenated polyolefin and polyester.

6. The harness of claim 1 including a metal coating layer capable of reflecting radar waves on at least one of said sheets.

7. The harness of claim 1 including means for attaching said harness to the hood of a land vehicle.

8. The cover of claim 1 wherein said flexible matrix is about 0.25 to 0.35 inches in thickness.

* * * * *